United States Patent [19]
Heller

[11] Patent Number: 5,870,860
[45] Date of Patent: Feb. 16, 1999

[54] SEALING AND WIPING ARRANGEMENT

[75] Inventor: Norbert Heller, Grefrath, Germany

[73] Assignee: Draftex Industries Limited, Edinburgh, Scotland

[21] Appl. No.: 6,733

[22] Filed: Jan. 14, 1998

[30] Foreign Application Priority Data

Jan. 15, 1997 [GB] United Kingdom .................... 9700758

[51] Int. Cl.$^6$ ..................................................... E06B 7/18
[52] U.S. Cl. ............................................. 49/477.1; 49/377
[58] Field of Search ................................ 49/477.1, 475.1, 49/484.1, 490.1, 495.1, 498.1, 377, 374

[56] References Cited

U.S. PATENT DOCUMENTS

| | | | |
|---|---|---|---|
| 4,976,067 | 12/1990 | Maass | 49/477.1 X |
| 4,989,369 | 2/1991 | Maass | 49/477 |
| 5,339,488 | 8/1994 | Maass | 49/477.1 X |
| 5,489,104 | 2/1996 | Wolff | 49/477.1 X |

FOREIGN PATENT DOCUMENTS

| | | |
|---|---|---|
| 0 486 163 | 5/1992 | European Pat. Off. . |
| 0 486 163 A1 | 5/1992 | European Pat. Off. . |
| 0 604 033 A2 | 6/1994 | European Pat. Off. . |
| 41 12 249 A1 | 11/1991 | Germany . |
| 664132 | 1/1952 | United Kingdom . |
| 905808 | 9/1962 | United Kingdom . |
| 1189002 | 4/1970 | United Kingdom . |
| 2221487 | 7/1970 | United Kingdom . |
| 2273733 | 6/1994 | United Kingdom . |

*Primary Examiner*—Jerry Redman
*Attorney, Agent, or Firm*—Leydig, Voit & Mayer, Ltd.

[57] ABSTRACT

A sealing and wiping arrangement is shown for mounting along the waist-line gap of a vehicle door through which gap a window glass is raised and lowered. The sealing and wiping arrangement is made of plastics or rubber material and grippingly engages a flange on the outside part of the vehicle door. A sealing lip is formed by part of the outside wall of a first flexible chamber. A wiper blade is mounted on the outside of the flexible wall of a second flexible chamber separate from the first chamber. When the glass is stationary, the first chamber is in an expanded state to ensure that the sealing lip is in firm sealing contact with the surface of the window glass. At the same time, the second chamber is in an expanded state and ensures that the wiper blade is clear of the window glass. When the window glass starts to move, the first chamber is partially evacuated so that the sealing lip is moved clear of the surface of the glass and does not impede glass movement. When the glass stops, the first chamber is re-expanded by increasing its internal pressure. When wiping of the glass surface is to take place, the second chamber is partially evacuated, and this causes the wiper blade to be pivotted into wiping contact with the glass surface.

19 Claims, 2 Drawing Sheets

SEALING AND WIPING ARRANGEMENT

BACKGROUND OF THE INVENTION

The invention relates to sealing and wiping arrangements. In an embodiment of the invention to be described in more detail below, such a sealing and wiping arrangement provides sealing for a movable window glass and a controllable wiping action.

SUMMARY OF THE INVENTION

According to the invention, there is provided a sealing and wiping arrangement for a movable window, comprising sealing means controllably movable into and out of sealing contact with the window glass, and wiping means controllably movable into and out of wiping contact with the window glass, the sealing means and the wiping means being separate from each other and separately controllable.

According to the invention, there is further provided a sealing and wiping arrangement for a window glass raisable from and lowerable into the lower part of a door in a vehicle body and for mounting alongside the waist-line gap in the door through which the window glass moves, comprising flexible material defining a first flexible-walled chamber having an expanded state and a contracted state and movable between the two states by changing the gas or air pressure within the chamber, flexible sealing means mounted on a wall of the first chamber so as to be moved between a sealing position in contact with the window glass and a non-sealing position not in sealing contact with the window glass as the chamber moves between its two states, flexible material defining a second flexible-walled chamber having an expanded state and a contracted state and movable between the two states by changing the gas or air pressure within the chamber, flexible wiping means mounted on a wall of the second chamber so as to be moved between a wiping position in contact with the window glass and a non-wiping position not in sealing contact with the window glass as the chamber moves between its two states, and control means for controllably and independently altering the pressure within the two chambers.

DESCRIPTION OF DRAWINGS

Sealing and wiping arrangements embodying the invention will now be described, by way of example only, with reference to the accompanying diagrammatic drawings in which.

DESCRIPTION OF PARTICULAR EMBODIMENTS

Figure 1:
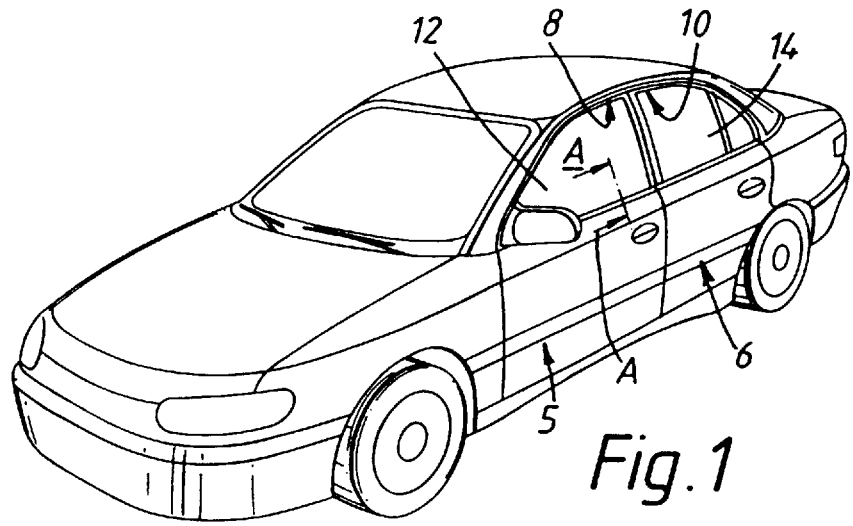
FIG. 1 is a perspective view of a vehicle in which the invention is embodied.

As shown in FIG. 1, a vehicle has doors 5 and 6 carrying window frames 8 and 10. In known manner, panes of window glass 12,14 can move upwardly and downwardly from and into the lower part of the doors.

A suitable window sealing and guiding channel is mounted in each frame 8,10 along the upright and sloping sides of the frame and along its curved top part. At the waist part of each door, where the window frame is attached to the lower part of the door, a longitudinal gap allows the window glass to descend into and rise from the hollow lower part of the door. The sealing and wiping arrangement now to be described in more detail provides a controllable sealing action, acting against the sides of the window pane as it moves through this longitudinally extending gap, and also provides a controllable wiping action.

Figure 2:
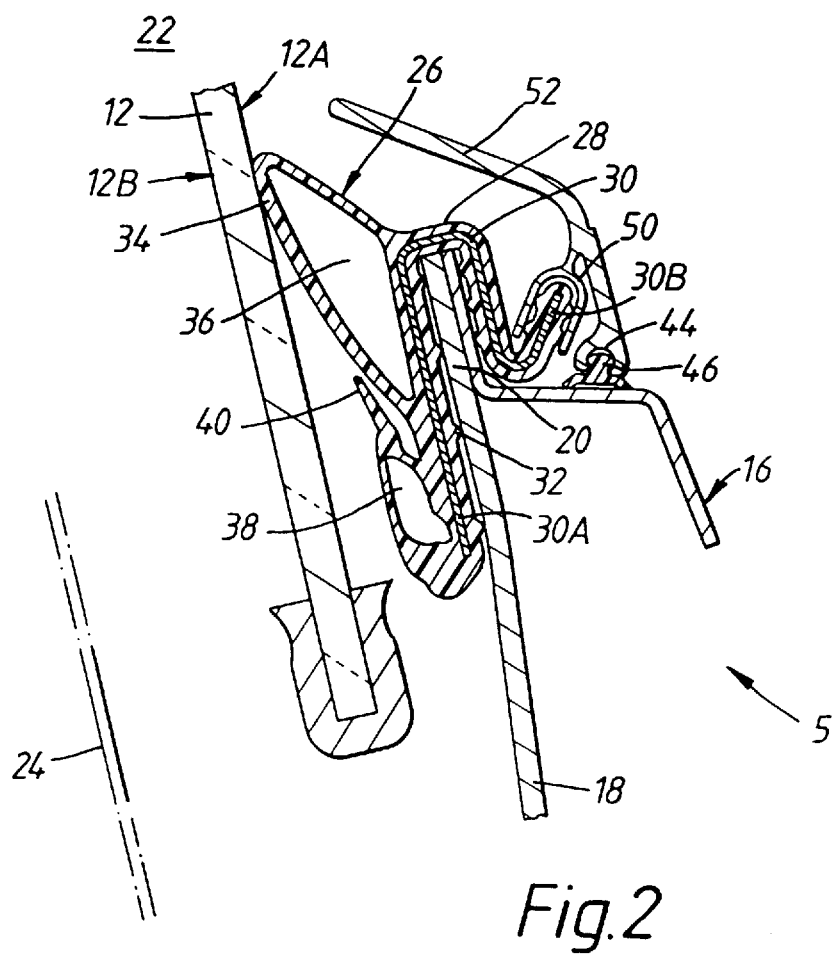
FIG. 2 is a cross-section on the line A—A of FIG. 1, showing one of the sealing and wiping arrangements in one of its operating configurations.

FIG. 2 shows the outer skin 16 of the vehicle door, and an intermediate wall member 18 of the door, the outer skin 16 and the wall member 18 being welded together to form a flange 20 running longitudinally along the waist of the door to define one edge of the longitudinally extending gap 22. On the inside of the vehicle, the door has an inner skin 24 shown only diagrammatically (and omitted from FIGS. 3 and 4).

The sealing and wiping arrangement is shown at 26. It is extruded or moulded from plastics or rubber or similar material. It extends along the length of the gap 22 and defines a channel 28 which embracingly grips the flange 20 to hold the arrangement 26 in position. In order to improve this grip, and to reinforce the rubber or plastics material, a metal reinforcement or carrier 30 is embedded within the material. The reinforcement or carrier 30 is generally channel-shaped in cross-section and has one of its channel walls extended at 30A, while the other channel wall 30B is extended and bent back in re-entrant form.

The metal carrier 30 may be made of unapertured metal or the metal may be provided with apertures such as slits or slots to increase its flexibility. Instead, it could comprise a series of separate elements arranged side-by-side along the length of the channel. Other forms of carrier such as made of wire, for example, can be used. If the sealing and wiping arrangement is produced by an extrusion process, the metal carrier 30 may be incorporated by using a cross-head extruder. In certain circumstances, it may be possible to omit the carrier.

The surfaces of the rubber or plastics material inside the channel 28 and facing the sides of the flange 20 and the intermediate wall 18 are provided with longitudinally extending lips or ridges such as shown at 32 for increasing the grip of the sealing and wiping arrangement.

The rubber or plastics material is integrally extended to produce a sealing lip 34, the distal end of which is connected back to the outside of the inverted base of the channel 30 so as to define a first hollow air-tight chamber 36. The sealing lip 34 bears against the surface 12A of the window glass 12, when the sealing and wiping arrangement has the configuration shown in FIG. 2.

Below chamber 36, the plastics or rubber material defines a second hollow air-tight chamber 38 which carries a wiping lip 40.

It will be understood that the sealing and wiping arrangement shown in FIG. 2 extends substantially along the entire length of the gap 22 and with substantially constant cross-section.

Chambers 36 and 38 are connected to a source of air pressure or suction.

A suitable sealing arrangement (not shown) is mounted on the inner skin 24 of the door so as to bear sealingly against the inside face 12B of the window glass 12.

When the window glass 12 is stationary, such as in the fully raised position for example, chamber 36 assumes the configuration shown in FIG. 2, that is, it is in an expanded condition which is achieved by normal air pressure within the chamber. The expanded chamber 36 presses the sealing lip 34 into firm sealing contact with the outside face 12A of the window glass. Effective sealing is thus produced, preventing the ingress of draught or moisture. The wiper blade 40 is clear of the glass 12.

Figure 3:
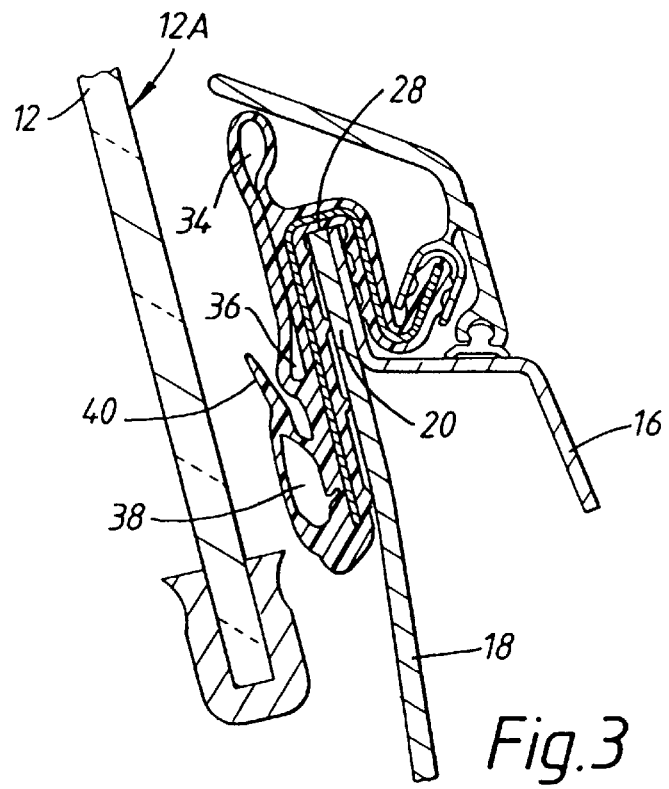
FIG. 3 corresponds to FIG. 2 but shows the arrangement of FIG. 2 in a different operating configuration.

When the window glass is to be raised or lowered, chamber 36 is deflated into a contracted condition. This is achieved by decreasing the pressure within the chamber, so that the chamber becomes collapsed and the lip 34 is moved out of contact with the window glass, as shown in FIG. 3. Friction against the window glass is thus reduced and the glass can be raised and lowered with reduced force and less noise. If the sealing lip 34 were not controllable by means of the chamber 36, but continuously pressed against the window glass 12A with relatively high pressure, the force required to raise and lower the window glass would be increased, and there would also be an increased likelihood of unpleasant noise or squeaking.

When the window glass has completed its movement, the pressure within the chamber 36 can once more be increased, so as to move the sealing lip 34 back into the sealing position shown in FIG. 2.

Figure 4:
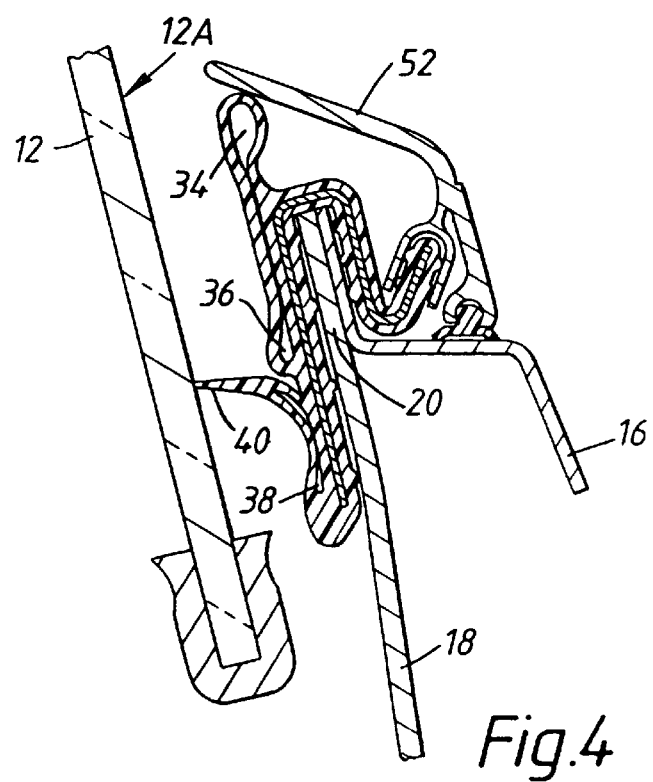
FIG. 4 corresponds to FIGS. 2 and 3 but shows the sealing and wiping arrangement in a further one of its operating configurations.

FIG. 4 shows the configuration adopted by the sealing and wiping arrangement when the surface 12A of the window glass is to be wiped or cleaned. In this configuration, the pressure within chamber 38 is reduced, by applying suction to it, so that chamber 38 changes from the expanded condition shown in FIGS. 2 and 3 to a contracted condition. As shown in FIG. 4, this has the effect of bending the wiper blade 40 into wiping contact with the surface 12A. This configuration of the sealing and wiping arrangement is adopted when the window glass 12 is being raised. As the window glass is raised, the wiper blade 40 removes moisture and dirt etc. from the glass surface.

When the wiping and cleaning operation has been completed, the pressure within chamber 38 is once more increased so that it returns to the expanded condition shown in FIGS. 2 and 3, with the wiper blade 40 clear of the window glass.

The sealing and guiding arrangement 26 may be substantially concealed from the external view by means of a curved decorative moulding 52, such as made of plastics material. This moulding may be secured in position by means of an integral channel 44 which grippingly engages a suitable fixture 46 mounted on the outside door skin 16. In addition, it is formed with a further support channel 50 which embraces an outwardly angled extension 30B of one side wall of the channel 30. The moulding 52 has an integral leaf which extends over the sealing and guiding arrangement 26.

Inflation and deflation of chambers 36 and 38 may be controllable manually by the driver or passenger. Instead, however, one or more of these operations can be controlled automatically. For example, in the case where the raising and lowering of the window glass is motorised, energisation of the motor to raise or lower the glass can be arranged automatically to deflate chamber 36, so as to move the arrangement into the configuration shown in FIG. 3, the chamber being automatically re-inflated when movement of the window glass stops. Similarly, chamber 38 could be arranged to be deflated automatically when the window glass is caused to be raised; in a modification, this automatic evacuation could also be controlled so as to take place only in wet weather (for example, when the windscreen wipers of the vehicle are operative).

The sealing and wiping arrangement 26 may be arranged so that the normal or relaxed condition of the material defining the chamber 36 is as shown in FIG. 2. In this case, of course, application of suction to the chamber is required in order to achieve the condition shown in FIG. 3. Instead, the normal or relaxed condition of the material defining chamber 36 could be as shown in FIG. 3. In that case, the application of above-atmospheric air pressure within chamber 36 would be necessary in order to hold the chamber in the condition shown in FIG. 2. Similarly, the normal condition of the material defining the chamber 38 could be as shown in FIG. 2, in which case the application of suction to the chamber is required in order to achieve the condition shown in FIG. 4. Instead, the latter condition could be the normal or relaxed condition, in which case the application of above-atmospheric air pressure to the chamber is necessary in order to achieve the condition shown in FIG. 2.

The arrangement illustrated is advantageous in that it enables independent control of sealing and wiping functions.

The sealing arrangement (not shown) on the inside of the window glass could take any known form. Instead, it could be of the same form as shown in FIGS. 2,3 and 4 and controlled in the same way. Instead of being the same as shown in FIGS. 2,3 and 4, it could omit the wiper blade 40 and the associated chamber 38.

What is claimed is:

1. A sealing and wiping arrangement for a movable window, comprising sealing means controllably movable into and out of sealing contact with the window glass, and wiping means controllably movable into and out of wiping contact with the window glass, the sealing means and the wiping means being separate from each other and being separately controllable whereby movement of either of them does not affect the other of them.

2. An arrangement according to claim 1, in which the sealing means is controllably movable by means of a chamber which can change between expanded and contracted states.

3. An arrangement according to claim 1, in which the wiping means is controllably movable by means of a chamber which can change between expanded and contracted states.

4. An arrangement according to claim 1, in which the sealing means and the wiping means are made of flexible material.

5. An arrangement according to claim 1, in which the sealing means comprises flexible material defining a sealing surface mounted on a movable wall forming part of the wall of a first flexible-walled chamber which can change between expanded and contracted states to provide the controllable movement of the sealing means, and the wiping means comprises a wiper blade mounted on a movable wall forming part of the wall of a second flexible-walled chamber which can change between expanded and contracted states to provide the controllable movement of the wiper means.

6. An arrangement according to claim 5, in which the two chambers are mounted spaced apart from each other in the direction of movement of the movable window.

7. An arrangement according to claim 5, in which the contracted states of at least one of the chambers is produced by the inherent shape and resilience of the flexible material, and its expanded state is produced by increasing the gas or air pressure within it.

8. An arrangement according to claim 5, in which the expanded state of at least one of the chambers is produced by the inherent shape and resilience of the flexible material, and its contracted state is produced by reducing the gas or air pressure within it.

9. An arrangement according to claim 1 for sealing and wiping a power-driven window glass, including means responsive to movement of the window glass for causing the controlled movement of the sealing means out of sealing contact with the window glass.

10. An arrangement according to claim 1 for sealing and wiping a power-driven window glass, including means responsive to movement of the window glass in at least one predetermined direction to cause the controlled movement of the wiping means in to wiping contact with the window glass.

11. A sealing and wiping arrangement for a window glass raisable from and lowerable into a lower part of a door in a vehicle body, the door having a waist-line gap through which the window glass moves and the arrangement being mountable alongside the waist-line gap, comprising flexible material defining first and second flexible-walled chamber means each having an outside and an expanded state and a contracted state and movable between the two states by changing the gas or air pressure therewithin, flexible sealing means and wiping means mounted on the outside of the chamber means so that the sealing means is moved between a sealing position for contacting a window glass and a non-sealing position for not being in sealing contact with a window glass as the first chamber means moves between its two states, and so that the flexible wiping means is moved between a wiping position for contacting a window glass and a non-wiping position for not being in wiping contact with a window glass as the second chamber means moves between its two states, and control means for controllably and independently altering the pressure within the two chambers, the sealing means being mounted on the flexible wall of the first chamber means, the wiping means being mounted on the flexible wall of the second chamber means, and the two chamber means being mounted to be separate from each other so that movement of either of them between its states does not affect the other thereof.

12. An arrangement according to claim 11, in which the two chamber means are mounted spaced apart from each other in the direction of raising and lowering of the window glass.

13. An arrangement according to claim 11, in which the flexible material defines gripping means for grippingly engaging rigid mounting means alongside the waist-line gap.

14. An arrangement according to claim 13, in which the mounting means comprises a rigid edge and in which the gripping means comprises a channel.

15. An arrangement according to claim 13, including embedded reinforcement within the flexible material for reinforcing the gripping means.

16. An arrangement according to claim 11, in which the shape and resilience of the flexible material tends to hold at least one of the chamber means in the expanded state and in which the chamber means is moved to the contracted state by decreasing the pressure within it.

17. An arrangement according to claim 11, in which the shape and resilience of the flexible material tends to hold at least one of the chamber means in the contracted state and in which the chamber means is moved to the expanded state by decreasing the pressure within it.

18. An arrangement according to claim 11, in which the window glass is power driven, and including means responsive to power-driven movement of the window glass to cause the control means to so change the pressure in the first chamber means that the first chamber means moves into one of its two states in which the sealing means is out of sealing contact with the window glass.

19. An arrangement according to claim 11, in which the window glass is power driven, and including means responsive to power-driven movement of the window glass in a predetermined direction to cause the control means to so change the pressure in the second chamber means that the second chamber means moves into the state in which the wiping means is out of wiping contact with the window glass.

* * * * *